(No Model.) 9 Sheets—Sheet 6.
D. DI B. SAVORGNAN.
APPARATUS FOR AND METHOD OF COLLECTING AND DELIVERING
MAIL MATTER.
No. 561,819. Patented June 9, 1896.
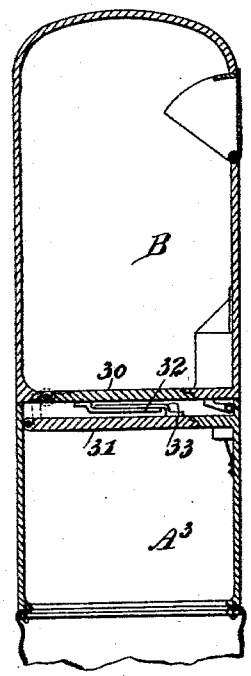
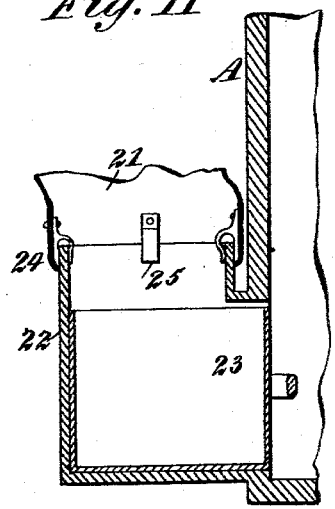
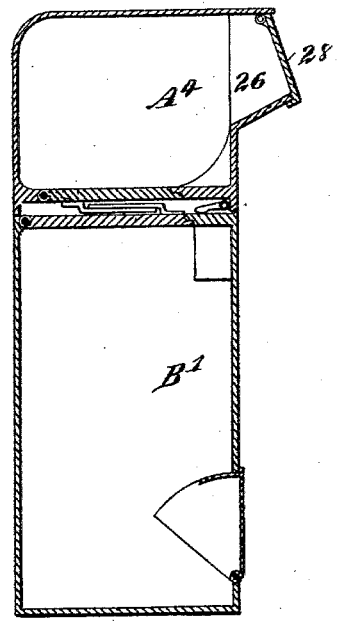
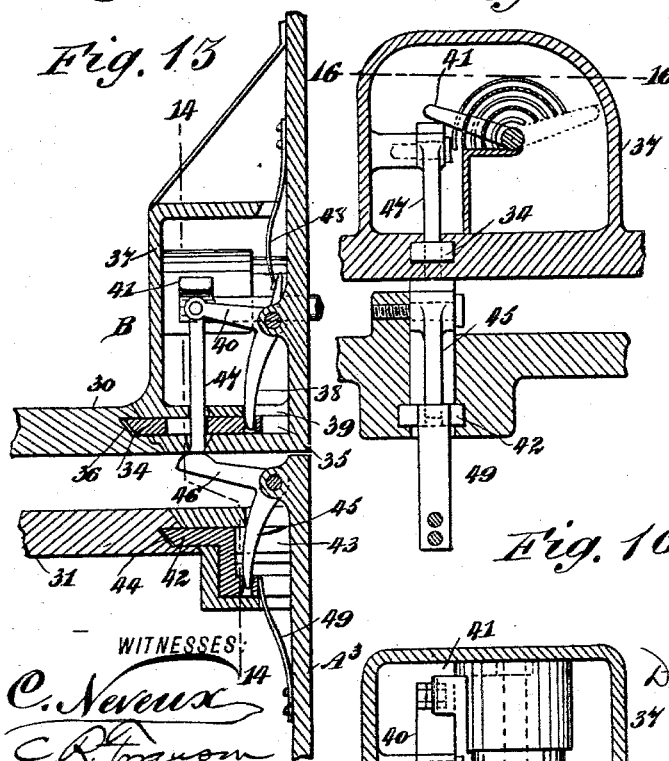
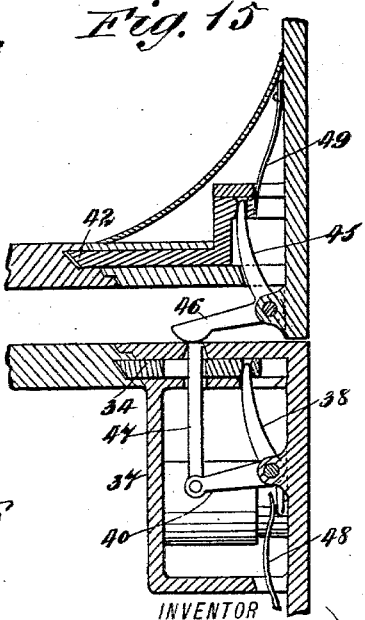
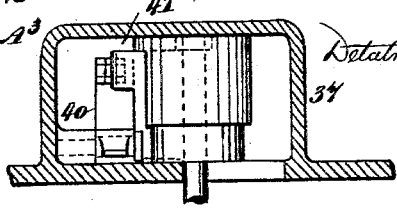
WITNESSES
C. Neveux
C. R. Ferguson
INVENTOR
Detalmo di Brazza Savorgnan
BY
Munn & Co
ATTORNEYS.

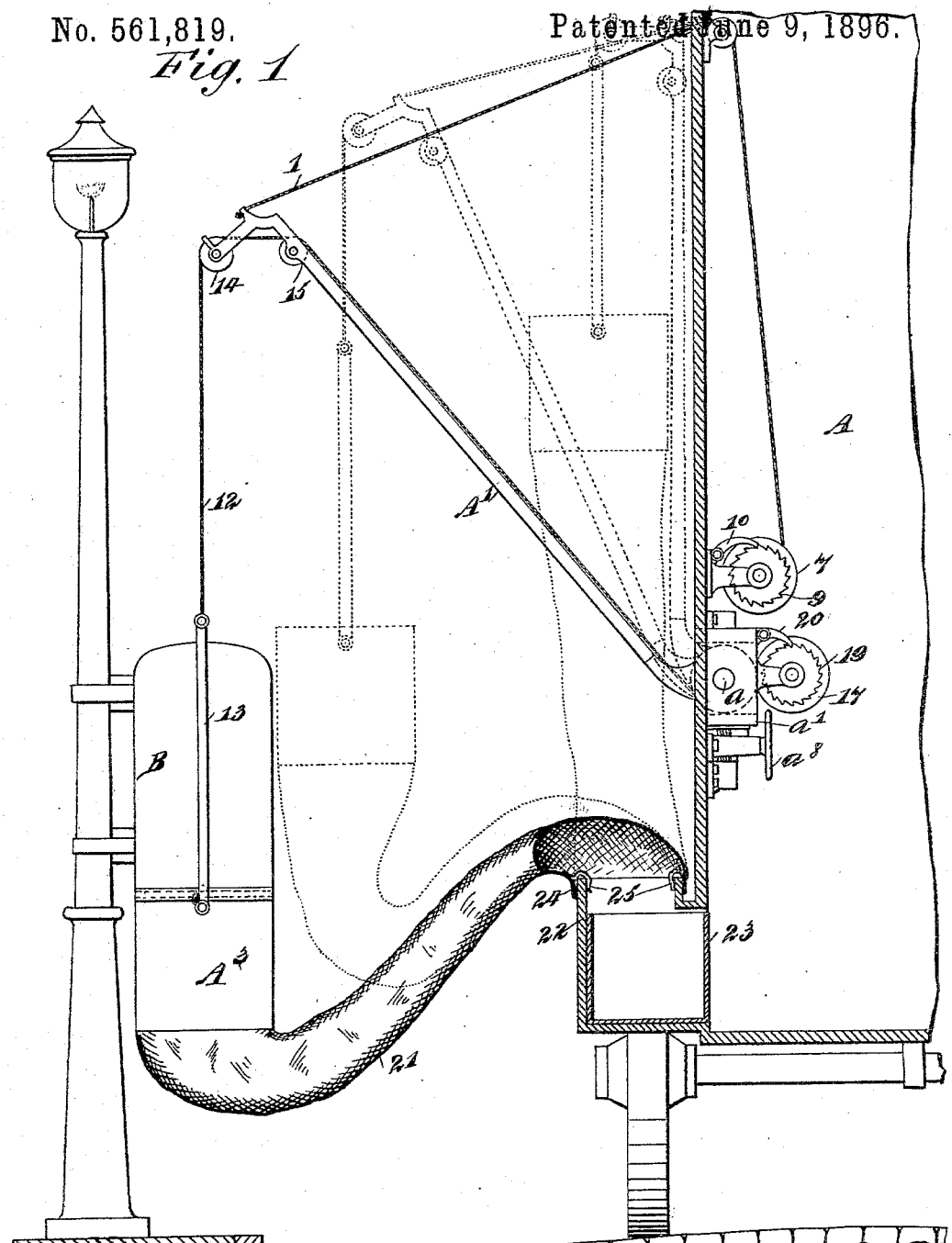

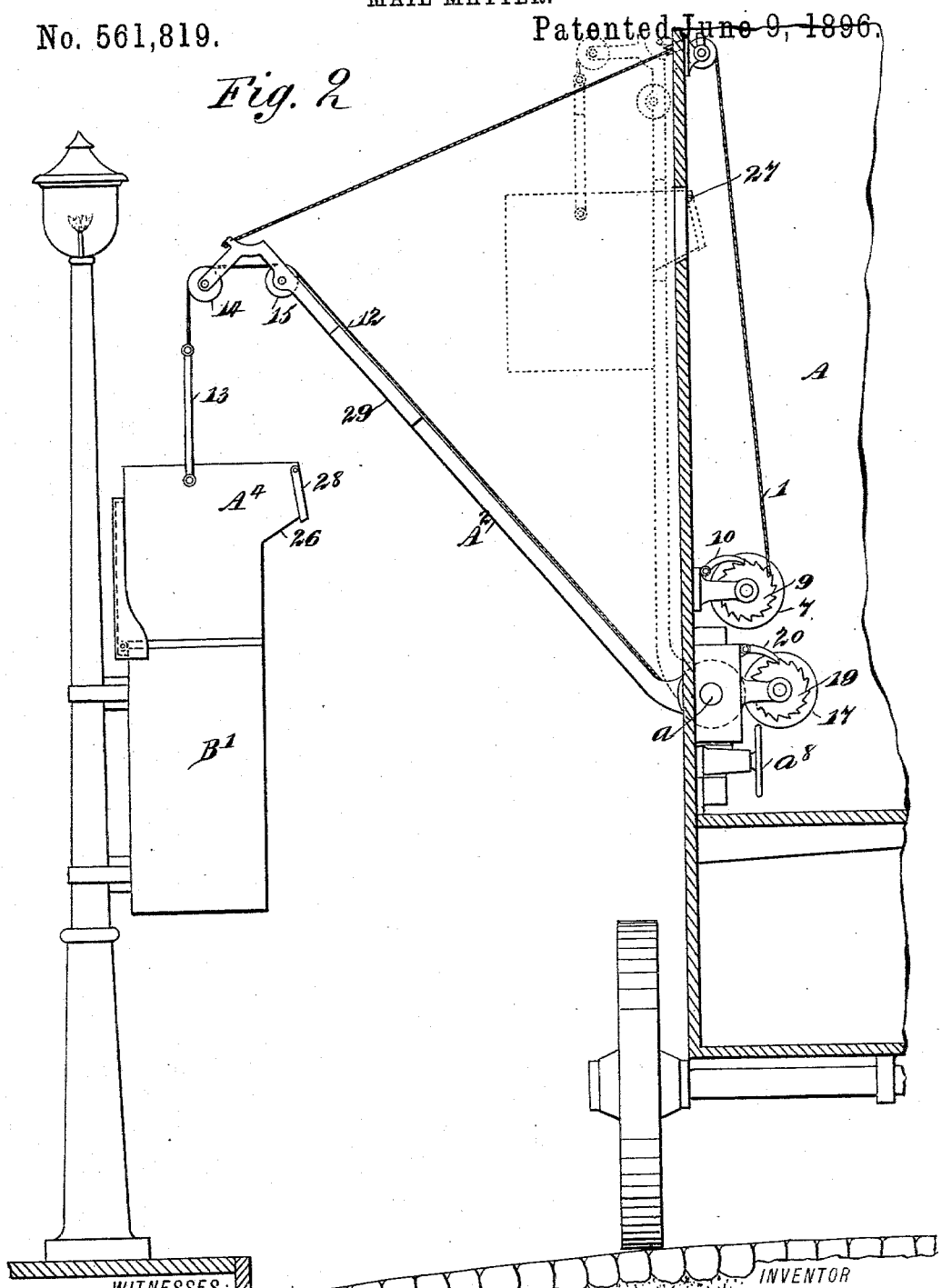

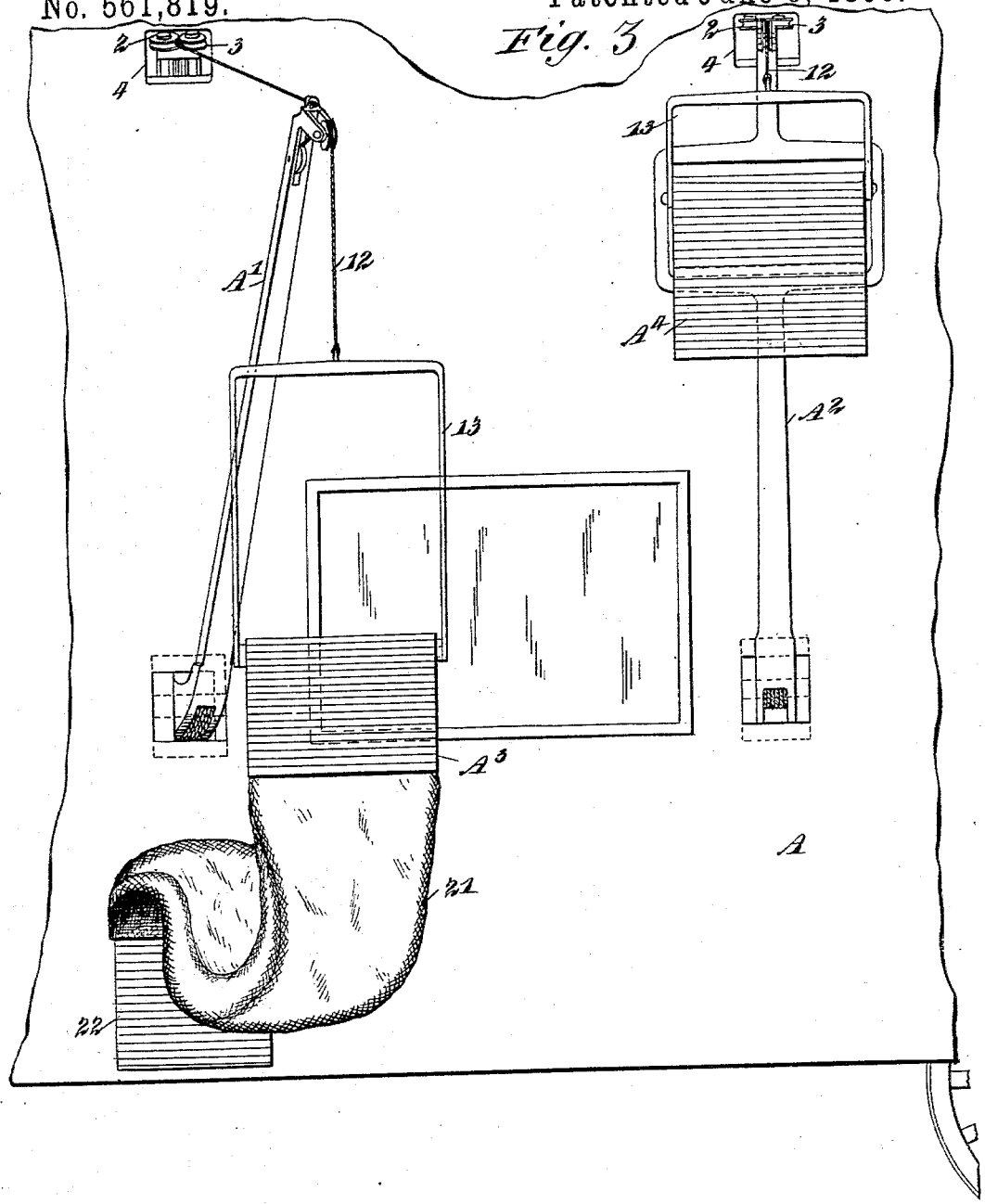

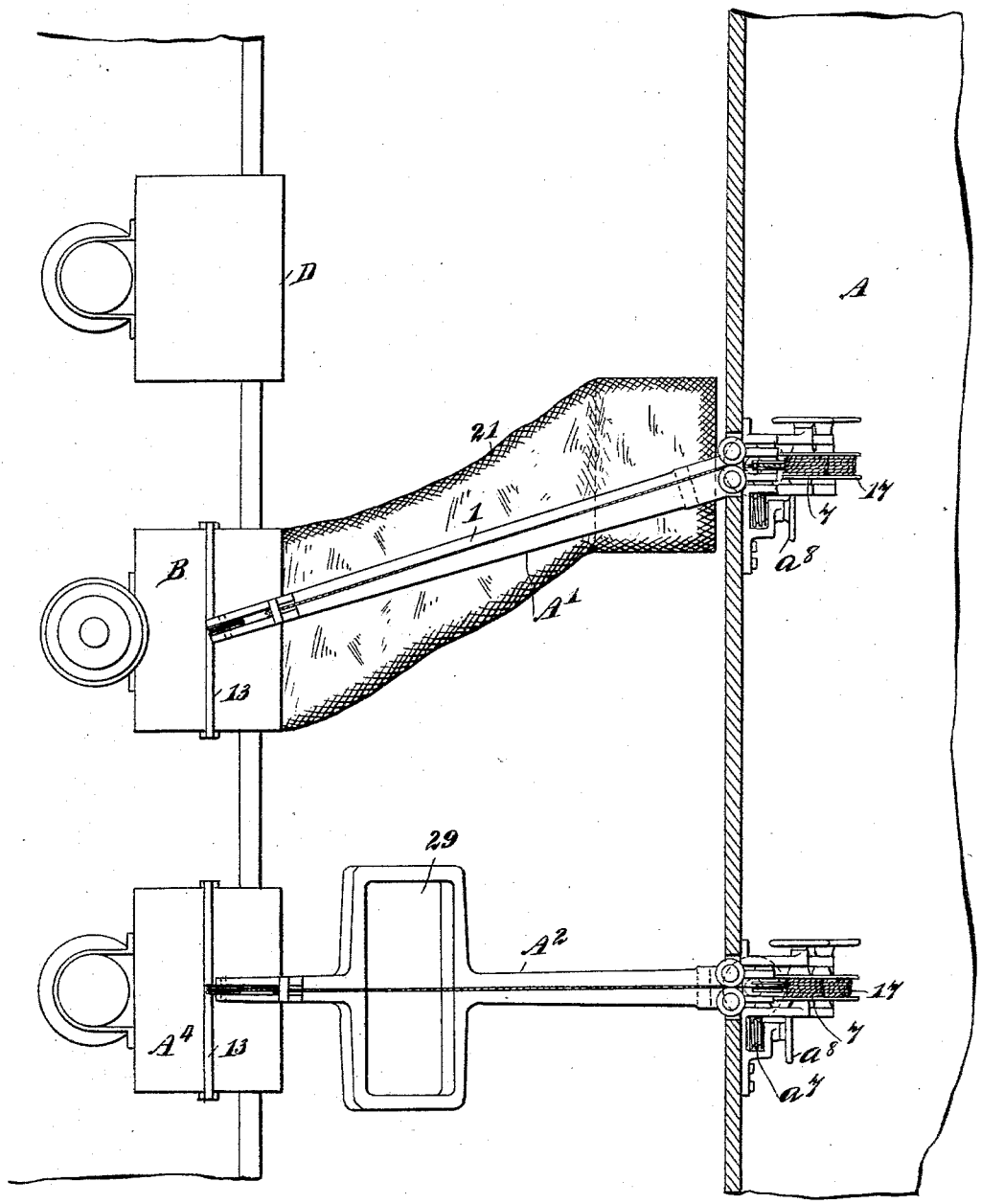

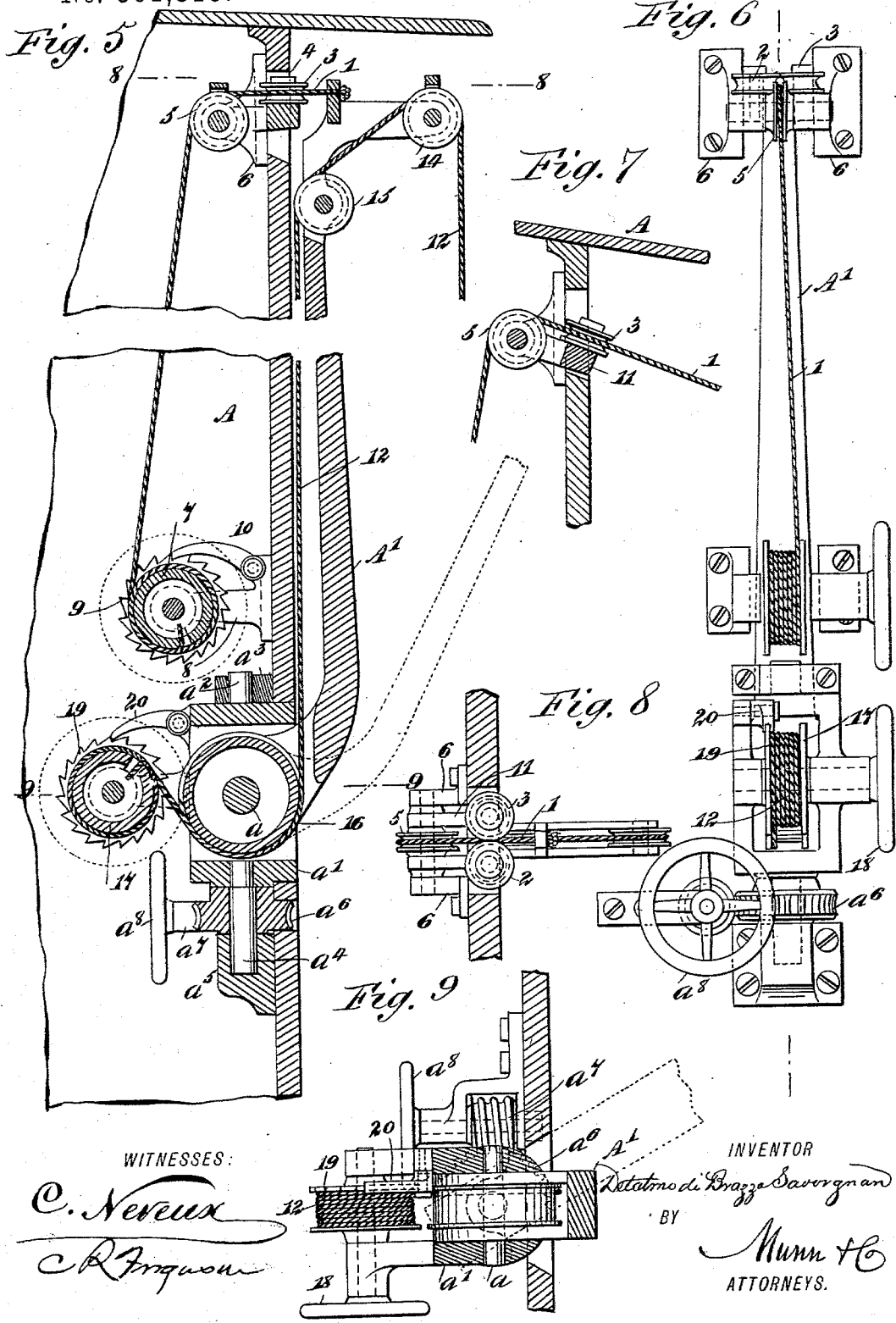

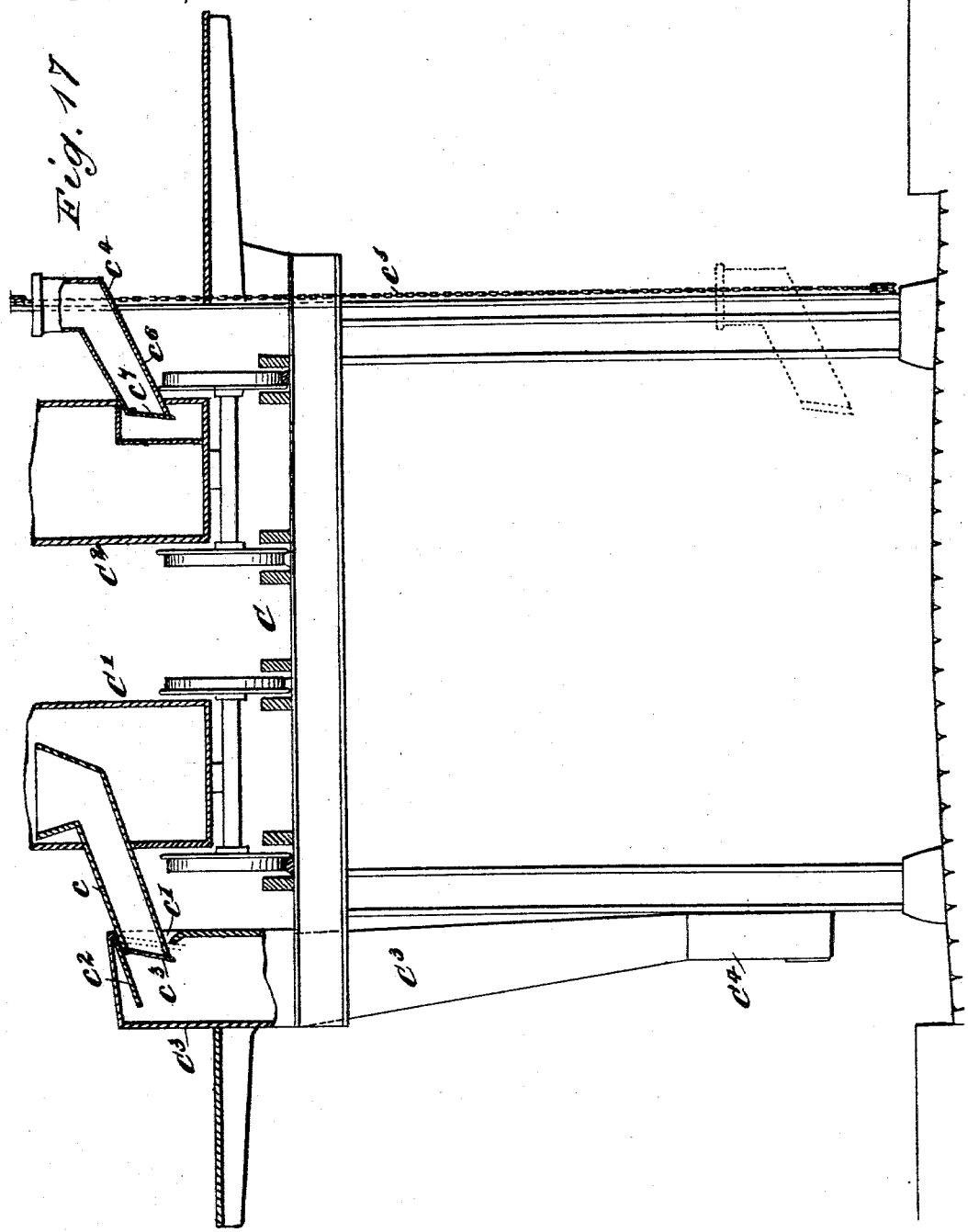

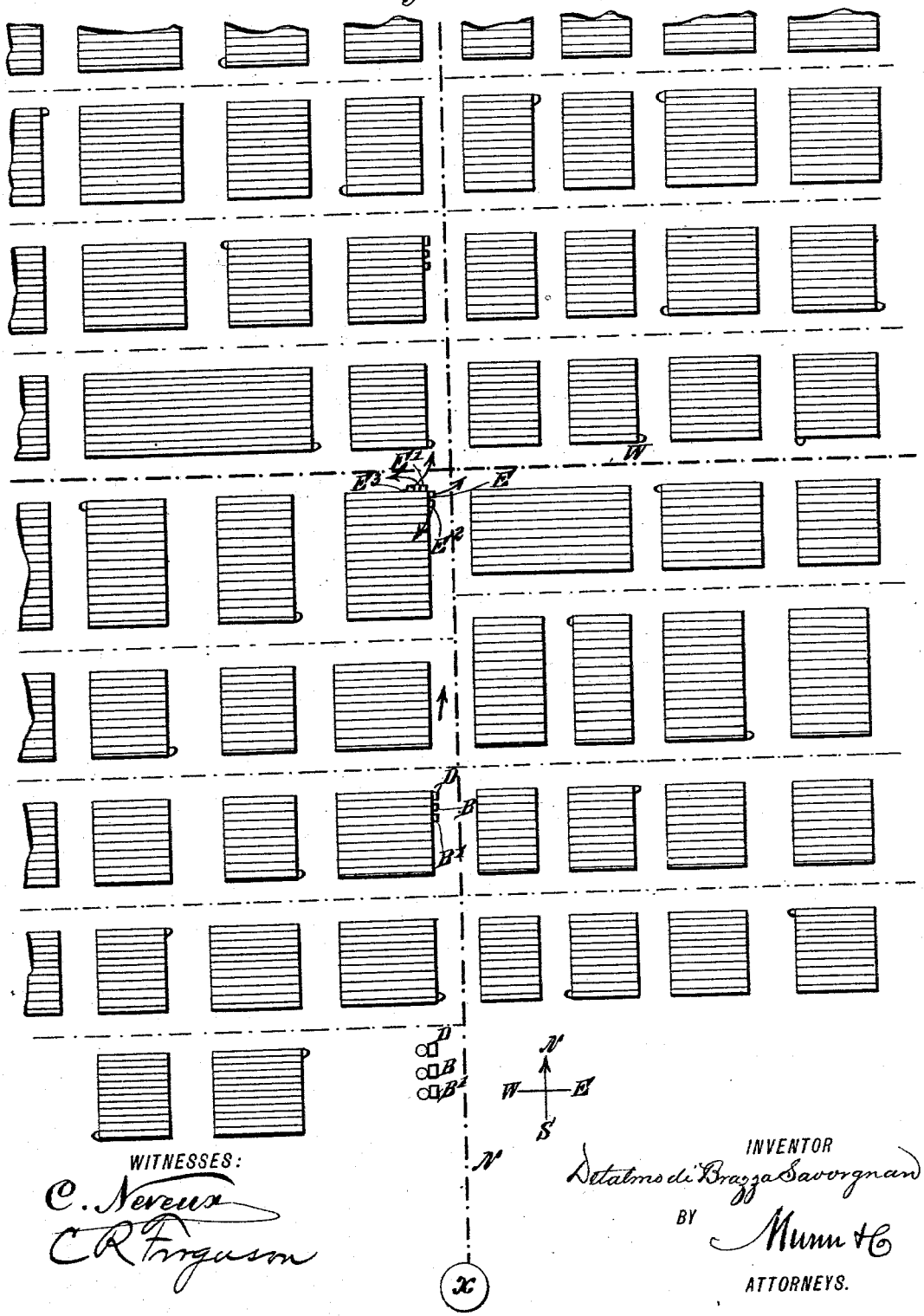

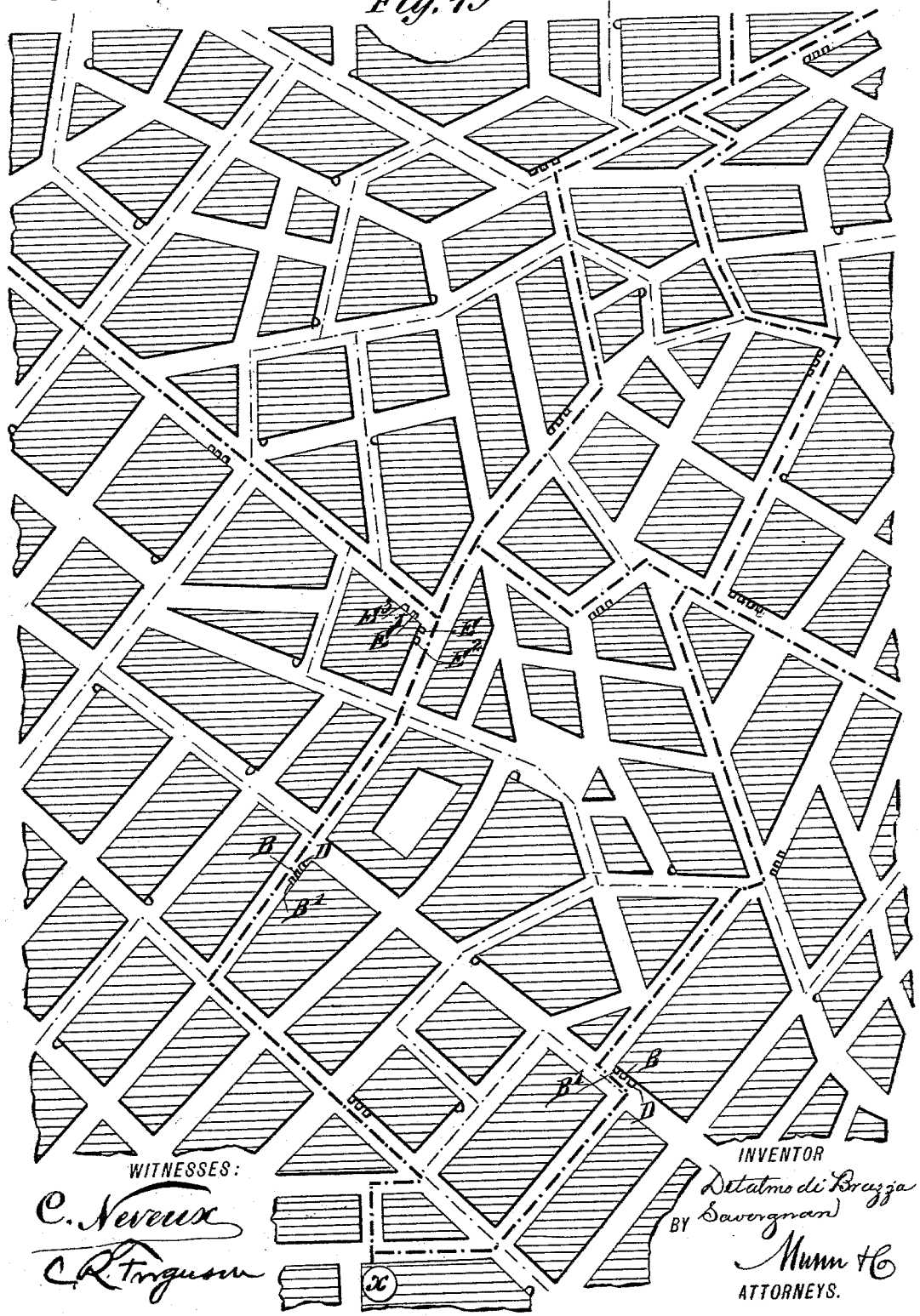

UNITED STATES PATENT OFFICE.

DETALMO DI BRAZZA SAVORGNAN, OF ROME, ITALY, ASSIGNOR TO CORA ANN SLOCOMB DI BRAZZA SAVORGNAN, OF MORUZZO, ITALY, AND NEW YORK, N. Y.

APPARATUS FOR AND METHOD OF COLLECTING AND DELIVERING MAIL-MATTER.

SPECIFICATION forming part of Letters Patent No. 561,819, dated June 9, 1896.

Application filed September 21, 1895. Serial No. 563,217. (No model.)

*To all whom it may concern:*

Be it known that I, DETALMO DI BRAZZA SAVORGNAN, of Rome, Italy, have invented a new and Improved Apparatus for and Method of Collection and Delivery of Mail-Matter, of which the following is a full, clear, and exact description.

This invention relates to an apparatus for and a method of collecting and distributing mail-matter; and it comprises a vehicle intended to be drawn through a certain section of a city or along a certain street and carrying mechanism whereby posted matter may be transferred from the stationary boxes along the street to the vehicle, and also means for transferring assorted matter intended for a certain district or districts from the vehicle to a fixed box or boxes.

The object of the invention is to facilitate the collection and distribution of mails and to obviate the use of substations as are now employed in large cities.

I will describe an apparatus embodying my invention and a method of carrying out the same, and then point out the novel features in the appended claims.

Reference is to be had to the accompanying drawings, forming a part of this specification, in which similar characters of reference indicate corresponding parts in all the views.

Figure 1 is a sectional view of a traveling vehicle embodying my invention and showing in elevation the means for gathering mail-matter from fixed boxes and transferring said mail to the vehicle. Fig. 2 is a similar view, but showing in elevation the mechanism for transferring assorted matter from a vehicle to a fixed box. Fig. 3 is a side elevation showing both transferring devices. Fig. 4 is a plan view thereof. Fig. 5 is a vertical transverse section showing mechanism for operating the transferring devices. Fig. 6 is a rear elevation of said transferring devices. Fig. 7 is a sectional detail of the upper portion of the device, showing an arrangement of ropes for raising or lowering a shifting device. Fig. 8 is a plan view thereof and partial section on the line 8 8 in Fig. 5. Fig. 9 is a sectional plan view on the line 9 9 of Fig. 5. Fig. 10 is a vertical section showing a stationary box and a portable collecting-box engaged therewith. Fig. 11 is a sectional detail showing means for attaching a flexible tube extended from the collecting-box to the receiving-box on the vehicle. Fig. 12 is a vertical section showing a stationary box and a portable transferring-box as engaged on the top of the stationary box. Fig. 13 is an enlarged sectional view of the locking mechanism for the doors or closures of the boxes shown in Fig. 10. Fig. 14 is a section on the line 14 14 of Fig. 13. Fig. 15 is a view similar to Fig. 13, but showing the parts reversed. Fig. 16 is a section on the line 16 16 of Fig. 14. Fig. 17 shows a modification of the delivering and collecting apparatus. Fig. 18 is a plan view of a city, showing the location of boxes for collecting and delivering mail-matter. Fig. 19 is a similar view of another city.

Referring to the drawings, A designates a vehicle—such, for instance, as a wagon or car designed to be drawn about the streets. Attached to the car are cranes A' A², one of which (here shown as A') is designed to carry and manipulate a collecting-box A³, and the other of which, A², is designed to carry a delivering-box A⁴. The construction of these boxes will be further described hereinafter.

The cranes and operating parts are substantially alike and are shown in detail in Figs. 5 to 9, inclusive. Means are provided for lowering or elevating the outer end of the crane, and also for swinging the same laterally, which may be made necessary by a vehicle stopping rearward or forward of a line drawn directly outward from the stationary box, so that a collecting or delivering box may be attached to the stationary box. The lower end of the crane A' is projected through an opening in the side wall of the car and is pivoted on the shaft $a$, which is extended horizontally in a yoke $a'$, which has a vertical trunnion $a^2$, journaled in a lug $a^3$, extended from the inner surface of the vehicle-wall, and a downwardly-extended trunnion $a^4$, journaled in a bracket $a^5$, also secured to the inner side of the car. By this construction it will be seen that the crane-arm may be rocked in a vertical plane on the shaft $a$ and shifted laterally by the turning of the yoke $a'$ in its vertical bearings.

As a means for oscillating the yoke $a'$ I provide its trunnion $a^4$ with a worm-wheel $a^6$, engaged by a worm on a worm-shaft $a^7$, which has a hand-wheel $a^8$ at its outer end, and for shifting the crane vertically a rope 1 is extended from the outer end of the crane and between guide-pulleys 2 3, movable in an opening 4, formed through the upper portion of the side wall of the vehicle, and from the guide-pulleys the rope 1 extends over a pulley 5, journaled in brackets 6, affixed to the inner side of the car-wall, and from this pulley 5 the rod extends to an attachment with a drum 7, having journal-bearings in a bracket or frame 8, extended inward from the side of the car. At one side the drum 7 has a ratchet-wheel 9 attached to it, and this ratchet-wheel is designed to be engaged by a pivoted dog 10, so as to prevent the rotation of the drum after the crane shall have been adjusted to its desired position vertically.

The guide-pulleys 2 3 are shown as peripherally grooved, so as to engage closely over the rope 1 and prevent its detachment, and to provide for a vertical movement of these guide-pulleys 2 3 as the angle of the rope 1 changes between its connection with the crane and the pulley 5 the said pulleys 2 3 are mounted on a frame 11, which is pivotally connected with and may rock on the shaft of the pulley 5. A rope 12 for carrying and manipulating the transferring-boxes relatively to the crane extends from a connection with said box. As here shown, this connection is a bail-piece 13, pivotally connected with the box. From the bail-piece the rope extends over a pulley 14, journaled in a projection from the upper end of the crane-arm, and thence over a pulley 15, journaled in the upper portion of the crane-arm, and thence down the rear side of the crane-arm around a grooved pulley 16, journaled on the shaft $a$, and thence to a drum 17, having bearings in a bracket extending from the inner portion of the side walls of the vehicle. The shaft of this drum 17 is provided with a handpiece 18, by which it may be rotated, and on the drum is secured a ratchet-wheel 19, adapted to be engaged by a pivoted pawl 20.

The box $A^3$ for transferring mail from a stationary box to the vehicle has a flexible tubular extension 21, connected with a chute 22, open at its top and having an opening to the interior of the vehicle A, and within which a receiving-box 23 may be placed. It is desirable, should a horse become unmanageable and start the vehicle while the box $A^3$ is in connection with a stationary box, that the flexible tubular connection 21 may be quickly and automatically detached from the vehicle. For this purpose the open lower end of the connection 21 is provided with a band 24, designed to surround the upper end of the chute 22, and to this band 24 spring-fingers 25 are attached and extend over the top and against the inner upper end of the chute, as plainly indicated in Fig. 1, and when the connection 21 is drawn from the chute 22, as described, the connecting-ropes 12 may be broken by the strain thereon.

The box $A^4$ for transferring mail-matter from the vehicle to a stationary box is provided at its top on the side adjacent to the vehicle with a chute 26, adapted to pass through an opening 27, made in the upper portion of the side wall of the vehicle. This chute 26 may be provided with a door 28, if desired. To allow said chute to pass through the opening 27, the crane $A^2$, which carries the box $A^4$, is provided with a rectangular opening 29, through which said chute may project, while the main body of the box $A^4$ is of course on the front side of the crane. As before stated, the manipulating apparatus for this crane $A^2$ and box $A^4$ is similar to the apparatus for the crane $A'$ and box $A^3$, and therefore need not be further described.

I will now describe the transferring-boxes and the means for connecting them with the stationary boxes, referring particularly to Figs. 10 to 16, inclusive.

B indicates a stationary box from which mail is to be transferred to the box $A^3$. The bottom of the box B has an opening in which is a hinged cover 30, and the top of the box $A^3$ has an opening provided with a hinged cover 31. Both these covers are intended to swing downward, and to cause them to swing in unison, by turning a crank applied to an extended shaft of the hinge on the cover 30, I provide the cover 30 with a keeper 32, open at its front, and with which the keeper 33, secured to the cover 31 and open at its rear side, may engage as the box $A^3$ is slid into engagement with the box B.

34 is a sliding locking-bolt movable in a guideway 35, formed in the bottom of the box B, and adapted to engage its end in an opening 36 in the edge of the cover 30.

Within a lock-case 37, formed in the lower front portion of the box A, is an angle-lever comprising a downwardly-extended arm 38, passing through a slot-opening 39 in the bottom wall of the lock-casing and engaging with the sliding bolt 34. The angle-lever also comprises an inwardly-extended arm 40, adapted to be engaged by the wing 41 of a key designed to be inserted through an opening in the front wall of the box B and into the lock-casing. Suitable guards may of course be provided within the lock-casing to engage in the notches formed in the wing portion of the key. A sliding locking-bolt 42, movable in a guideway 43, formed in the top wall of the box $A^3$, is adapted to engage in an opening 44 in the edge of the cover 31, and to this box $A^3$ an angle-lever is pivoted and comprises an arm 45, projected downward through an opening in the top of the box $A^3$ and engaged with a portion of the sliding locking-bolt 42. The other arm 46 of this angle-lever is extended inward and slightly upward and is adapted to be engaged by the end of a rod 47, pivotally connected to and depending from the arm 40 of the angle-lever in the lock-casing through an opening in the bottom of the box B. By this construction it is obvious that when the arm 40 is rocked downward by means of the key the arm 38 will withdraw the bolt 34 from the opening 36 in the cover 30, and the rod 47, by pushing downward on the arm 46, will rock the arm 45 to move the sliding bolt 42 in engagement with the door 31. Then both of these doors 30 31 may be turned on their pivots or hinges to provide a communication between the boxes.

A spring 48, attached to the interior of the box B, engages a projection from the angle-lever comprising the arms 38 40 and serves to rock said angle-lever to force the locking-bolt 34 outward, and a spring 49 is attached to the inner side of the box $A^3$ and engages against the end of the sliding bolt 42 and serves to slide said bolt to its locking position. Both the locking-bolts are beveled downward on their locking ends and the edges of the doors 30 31 are beveled upward, so that the locking-bolts may be moved back by the engagement of the doors while some are being closed, and the springs will force the bolts into locking engagement when the doors are completely closed.

The manner of engaging a transferring-box $A^4$ with a receiving stationary box B' is quite similar to the devices in connection with the boxes $A^3$ and B, excepting that the box B' has a door-closed opening at its top and the box $A^4$ has a door-closed opening in its bottom, and of course the locking-bolt-opening mechanism is reversed, bringing the lock-case within the stationary box B', which is below the box $A^4$.

Referring now to the modification shown in Fig. 17, which illustrates a means for transferring letters from a vehicle on an elevated road to a box nearer the street-level, and also for transferring letters deposited in a box near the street-level to a car on an elevated structure, C designates the elevated structure upon the tracks of which the cars C' $C^2$ are movable. The car C' has a chute $c$ extended outward from it and designed to project through an opening $c'$ in the upper portion of a chute $C^3$, leading to a box $C^4$, affixed to one of the standards of the railway structure at a point to be easily reached from the street. The opening $c'$ may be provided with a suitable inwardly-opening cover $c^2$, and the outer end of the chute $c$ may be provided with an outwardly-opening cover $c^3$. The inner end of said chute $c$ of course opens into a suitable hopper arranged within the car C'. In connection with the car $C^2$, I show a movable receiver $c^4$, secured to chains $c^5$, extended over pulleys, whereby the said receiver $c^4$ will be raised or lowered relatively to the elevated structure. When in its upward position, as shown in full lines in Fig. 17, a chute $c^6$ is designed to project through an opening in the side of the car $C^2$, so that letters may be discharged into said car. The outer end of the chute $c^6$ may be provided with an outwardly-swinging door $c^7$.

Having described the apparatus for the collection and distribution of mail, I will now describe a system designed by me for the rapid collection and distribution of letters throughout a city, referring for illustration thereof particularly to Figs. 18 and 19. As this system does away with the existence of sub-stations and post-offices a city may be blocked out in certain districts each one to be patrolled by an employee of the postal service whose duty it will be to collect letters from the several boxes of deposit within his district and deposit them in a general box D on the route traversed by a collecting and distributing vehicle nearest his district. The letters collected from the several districts at each side of the main route will be deposited in this general box D by the collectors, and a collector will then take letters from the proper box to be distributed to stations within his section—that is, a collector for an eastern district will take letters from the box B, and a collector for a western district will take letters from the box B'. Assuming now that a collecting and distributing vehicle such as heretofore described is traveling north or on the line marked N, which starts from the general post-office or station $x$, the attendant will assort the mail received at the general post-office and upon reaching the first series of fixed letter-boxes the letters for an eastern district will be placed in the box B and the letters for a western district will be placed in the box B', and then the attendant will take all the letters collected in the several districts from the box D, and while traveling between the first group of fixed boxes to the next the said letters will be properly assorted to be placed in the proper boxes of the next group, in the manner first described. Of course, if certain letters are to go to a more distant part of the city they will be carried in the vehicle until the proper group of boxes shall have been reached.

In a system of this character and in the large cities there will be intersecting or crossing routes for the collecting and distributing vehicles, and in Fig. 18 I have indicated such a crossing route as W. At the junction of these routes a series of exchange-boxes is placed and here indicated as E E' $E^2$ $E^3$. When a vehicle on the northern trip of the route N reaches this group of boxes, the letters that are designed to be placed on the vehicle traveling east on the route marked N will be deposited in the box E, and the letters destined for the vehicle on the route W when traveling west will be deposited in the box E', and the attendant of the vehicle traveling north will gather letters from the box $E^3$, which shall have been deposited therein by the vehicle traveling east on the route W, and the same operation will take place when the vehicle on the route N is traveling south, excepting that it will take letters previously deposited from the vehicle on the route W from the box E².

During the collection and distribution of mail-matter by means of the vehicles and as the mail-matter is assorted the letters or other matter destined for transportation out of the city will be placed in proper receptacles in the vehicle and carried to the general post-office, and of course several wagons may travel over the same road, one following the other in close succession, so that there may be a very rapid collection and distribution of mail-matter.

In this system the several general boxes F of deposit may be provided with suitable automatic registering and recording devices—such, for instance, as shown in my application for Letters Patent filed August 2, 1895, Serial No. 557,984—and therefore it will be unnecessary to transport the letters to a general post-office or station for the purpose of cancellation, thus saving a great amount of time in the handling of mail-matter, and practically assuring a safe receipt of money deposited for postage.

Having thus described my invention, I claim as new and desire to secure by Letters Patent—

1. In an apparatus for the collection and delivery of mail-matter, a traveling vehicle, a swinging crane attached thereto, a box carried by said crane and adapted to be engaged with a stationary letter-box, and a chute on said box carried by the crane for directing mail-matter into the vehicle, substantially as specified.

2. In an apparatus for the collection and delivery of mail-matter, a traveling vehicle, a vertically and laterally movable crane carried thereby, mechanism within the vehicle for causing these movements of the crane, a letter-box having a flexible and adjustable connection with the crane, and a chute on said box for the introduction of mail-matter, substantially as specified.

3. In an apparatus for the collection and delivery of mail-matter, a traveling vehicle, a swinging crane thereon, a letter-receiving box supported by said crane and adapted to be engaged with a stationary letter-box, and a flexible chute extending from said first-named box providing communication from said box to the interior of the vehicle, substantially as specified.

4. In an apparatus for the collection and delivery of mail-matter, a traveling vehicle, a crane carried by said vehicle, a letter-receiving box supported by said crane and having a flexible connection with the interior of the vehicle, another crane on said vehicle, a letter-delivering box supported by said crane and adapted to be engaged with a fixed letter-box, and a chute on said delivering-box adapted to pass through an opening in the wall of the vehicle, substantially as specified.

5. In an apparatus for the collection and delivery of mail-matter, a traveling vehicle, a crane carried thereby and having a vertical and laterally-swinging motion, a rope extended from a drum within the vehicle along the crane and over pulleys at its outer end, a box supported by said rope, a crane-hoisting rope extended from the outer end portion of said crane to a winding-drum within the vehicle, and deflecting guide-rollers for said hoisting-rope, substantially as specified.

6. In an apparatus for the collection and delivery of mail-matter, a traveling vehicle having an opening through the lower portion of its side wall, a crane having its lower end extended through said opening and pivoted on a horizontal shaft, a vertically-pivoted yoke carrying said horizontal shaft, a worm mechanism for turning or deflecting said yoke, whereby the crane may be moved laterally, and means for moving the crane vertically, substantially as specified.

7. In an apparatus for the collection and delivery of mail-matter, a traveling vehicle, a crane supported thereby, a letter-box carried by the crane, and a flexible chute extended from said box and having a detachable connection with a chute on the vehicle, substantially as specified.

8. For use with a mail collecting and delivering apparatus, substantially as specified, a fixed letter-box having a vertically-swinging door adapted to be engaged by the swinging door of a box carried by and having a swinging connection with the mail collecting and delivering apparatus, and a lock-actuating mechanism in the stationary box by means of which the doors of both boxes may be released, as specified.

9. In an apparatus for the collection and delivery of mail-matter, a traveling vehicle, a letter-box, a chute providing communication between the letter-box and the interior of the vehicle, and an outwardly-opening cover for the end of said chute, substantially as specified.

10. In the distribution of mail-matter, groups of boxes arranged in districts, each group comprising a box to receive collected and unassorted mail-matter, another box to receive mail-matter destined for a certain direction, and another box to receive mail-matter destined for another direction, a traveling vehicle and a box having swinging connection with the vehicle and adapted for engagement with one of said group boxes, substantially as specified.

DETALMO DI BRAZZA SAVORGNAN.

Witnesses:
C. R. FERGUSON,
JNO. M. RITTER.